(12) United States Patent
Cao et al.

(10) Patent No.: US 11,923,565 B2
(45) Date of Patent: Mar. 5, 2024

(54) BATTERY MODULE AND DEVICE

(71) Applicant: Contemporary Amperex Technology Co., Limited, Ningde (CN)

(72) Inventors: Gen Cao, Ningde (CN); Jihua Yao, Ningde (CN); Huayuan Cao, Ningde (CN); Xingyuan Wu, Ningde (CN); Xiaoteng Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 614 days.

(21) Appl. No.: 17/140,842

(22) Filed: Jan. 4, 2021

(65) Prior Publication Data

US 2021/0126327 A1 Apr. 29, 2021

Related U.S. Application Data

(63) Continuation of application No. PCT/CN2020/092177, filed on May 25, 2020.

(30) Foreign Application Priority Data

Jun. 28, 2019 (CN) .......................... 201910575254.9

(51) Int. Cl.
*H01M 50/569* (2021.01)
*H01M 10/04* (2006.01)
(Continued)

(52) U.S. Cl.
CPC ..... *H01M 50/569* (2021.01); *H01M 10/0481* (2013.01); *H01M 10/486* (2013.01);
(Continued)

(58) Field of Classification Search
CPC ............. H01M 50/569; H01M 50/204; H01M 50/244; H01M 50/284; H01M 2200/10
See application file for complete search history.

(56) References Cited

U.S. PATENT DOCUMENTS 9,608,298 B2   3/2017  Jeong et al.
10,818,984 B2  10/2020 Haydin et al.
(Continued)

FOREIGN PATENT DOCUMENTS

CN    101872986 A   10/2010
CN    202495555 U   10/2012
(Continued)

OTHER PUBLICATIONS

International Search Report issued in International Application No. PCT/CN2020/092177, dated Jul. 17, 2020, 4 pages.
(Continued)

*Primary Examiner* — Aiqun Li
(74) *Attorney, Agent, or Firm* — Sterne, Kessler, Goldstein & Fox P.L.L.C.

(57) ABSTRACT

A battery module is provided including a battery unit that includes a battery top cover; a temperature measurement unit, including a temperature collection element to collect temperature of the battery top cover; a harness plate, arranged on the battery top cover and including a harness plate body and a limiting structure arranged on the harness plate body, wherein the limiting structure is matched with the temperature measurement unit; a circuit board, arranged on the harness plate and including a circuit board body and an extending strip arranged on the circuit board body, wherein the temperature collection element is connected with the extending strip; and an electrical connecting sheet arranged on the harness plate to connect different battery units, wherein the temperature measurement unit is arranged between the electrical connecting sheet and the battery top cover, and the electrical connecting sheet exerts pressure onto the temperature measurement unit.

16 Claims, 7 Drawing Sheets

(51) Int. Cl.
  *H01M 10/48* (2006.01)
  *H01M 50/204* (2021.01)
  *H01M 50/244* (2021.01)
  *H01M 50/271* (2021.01)
  *H01M 50/284* (2021.01)

(52) U.S. Cl.
  CPC ....... *H01M 50/204* (2021.01); *H01M 50/244* (2021.01); *H01M 50/271* (2021.01); *H01M 50/284* (2021.01)

(56) References Cited

U.S. PATENT DOCUMENTS

| | | |
|---|---|---|
| 2010/0271223 A1 | 10/2010 | Ohkura et al. |
| 2013/0143085 A1 | 6/2013 | Yoon |
| 2016/0035467 A1 | 2/2016 | Haydin et al. |
| 2018/0309113 A1 | 10/2018 | Nakayama et al. |

FOREIGN PATENT DOCUMENTS

| | | |
|---|---|---|
| CN | 104466067 A | 3/2015 |
| CN | 105321637 A | 2/2016 |
| CN | 206806468 U | 12/2017 |
| CN | 207116634 U | 3/2018 |
| CN | 207183388 U | 4/2018 |
| CN | 207558994 U | 6/2018 |
| CN | 108417766 A | 8/2018 |
| CN | 207779574 U | 8/2018 |
| CN | 207781834 U | 8/2018 |
| EP | 3 151 332 A1 | 4/2017 |
| JP | 2008304295 A | 12/2008 |
| JP | 2016100247 A | 5/2016 |
| WO | 2012075948 A1 | 6/2012 |

OTHER PUBLICATIONS

Chinese Office Action issued in Chinese Application No. 201910575254.9, dated Sep. 18, 2021, 23 pages.
Chinese Office Action issued in Chinese Application No. 201910575254.9, dated May 24, 2021, 14 pages.

BATTERY MODULE AND DEVICE

CROSS-REFERENCE TO RELATED APPLICATIONS

This application is a continuation of International Application No. PCT/CN2020/092177, filed on May 25, 2020, which claims the priority of the Chinese patent application No. 201910575254.9, filed with the Chinese Patent Office on Jun. 28, 2019 and entitled "Battery Module." Each of these applications is incorporated by reference herein in its entirety.

TECHNICAL FIELD

The present application relates to the technical field of batteries, in particular to a battery module and a device.

BACKGROUND

The normal operating temperature of a battery module is between −30° C. and 55° C., and when the temperature range is exceeded, the power of the battery module will be limited to realize safety protection of the battery module.

In a temperature collection structure of the battery module known to the applicant, temperature on an electrical connecting sheet is collected through a metal sheet, and is transmitted to a temperature sensor which serves as a temperature collection element, and the temperature of the electrical connecting sheet is deemed as the temperature inside a battery unit.

In the process of finding the present application, the inventor found that, a conventional temperature collection structure of the battery module has the following disadvantages:

The spatial size inside the battery module is limited, and in consideration of the manufacturing and cost influences, the width and thickness of the electrical connecting sheet cannot be manufactured to be very large. When the battery module is under a low-power working condition, the temperature of the electrical connecting sheet is approximate to the temperature of a cell, and when the battery module is under a high-power working condition, due to the limitation of an overcurrent area of the electrical connecting sheet, the temperature of the electrical connecting sheet will rise sharply, while the temperature of the battery rises slowly. A huge difference can exist between the temperature of the electrical connecting sheet and the temperature inside the battery unit, such that the temperature collected by the temperature sensor on the electrical connecting sheet is not matched with the actual temperature inside the battery unit, thereby influencing discharge power of the battery module.

The metal sheet on a circuit board is welded with the electrical connecting sheet, a tail end of the metal sheet is connected with a temperature sensor, the temperature sensor is connected with the metal sheet through thermal conductive adhesive. Thus, the temperature collection transmission path is electrical connecting sheet→metal sheet→thermal conductive adhesive→temperature sensor. The temperature collection transmission path is long, and the temperature collection accuracy and response speed are low.

SUMMARY

An object of the present application is to provide a battery module and a device, aiming at solving the problem that the actual temperature inside the battery unit cannot be reflected through temperature collection of an electrical connecting sheet.

Embodiments of the present application provide a battery module, including: a plurality of battery units, wherein the battery unit includes a battery top cover; a temperature measurement unit, including a temperature collection element configured to collect temperature of the battery top cover; a harness plate, arranged on the battery top cover and including a harness plate body and a limiting structure arranged on the harness plate body, wherein the limiting structure cooperates with the temperature measurement unit to limit the position of the temperature measurement unit; a circuit board, arranged on the harness plate and including a circuit board body and an extending strip arranged on the circuit board body, wherein the temperature collection element is connected with the extending strip to transmit collected temperature signals to the circuit board body through the extending strip; and an electrical connecting sheet, connecting adjacent battery units and arranged on the harness plate, wherein the temperature measurement unit is arranged between the electrical connecting sheet and the battery top cover, and the electrical connecting sheet exerts pressure onto the temperature measurement unit, such that the temperature measurement unit is kept in contact with the battery top cover.

In some embodiments, the limiting structure is arranged between the electrical connecting sheet and the battery top cover, and the electrical connecting sheet exerts pressure onto the temperature measurement unit through the limiting structure.

In some embodiments, the temperature measurement unit further includes a reinforcing plate, wherein the reinforcing plate is connected with the extending strip, a connecting area, on the extending strip, of the temperature collection element is within a connecting area, on the extending strip, of the reinforcing plate, the limiting structure is fitted with the reinforcing plate in a limiting manner, and the electrical connecting sheet exerts pressure onto the reinforcing plate of the temperature measurement unit through the limiting structure.

In some embodiments, the temperature collection element and the reinforcing plate are arranged at two sides of the extending strip respectively.

In some embodiments, the temperature collection element and the reinforcing plate are arranged at the same side of the extending strip, the reinforcing plate includes an accommodating hole, and the temperature collection element is arranged in the accommodating hole.

In some embodiments, the limiting structure includes a limiting clamping groove, and the reinforcing plate is installed in the limiting clamping groove.

In some embodiments, the limiting structure includes a limiting protrusion which protrudes towards the electrical connecting sheet, and the limiting protrusion abuts against the electrical connecting sheet.

In some embodiments, the temperature measurement unit includes a thermal conducting pad, and the thermal conducting pad is arranged between the temperature collection element and the battery top cover.

In some embodiments, the limiting structure includes a limiting hole, and the thermal conducting pad is arranged in the limiting hole.

In some embodiments, the temperature measurement unit includes a thermal conducting pad, the thermal conducting pad is arranged between the reinforcing plate and the battery top cover, the thermal conducting pad is an elastic pad, and the thickness of the thermal conducting pad in the original state is greater than the distance between the reinforcing plate and the battery top cover.

In some embodiments, the extending strip includes an extending strip body and an extending strip connecting part which connects the extending strip body with the circuit board body, the extending strip body is bent to be L-shaped, the extending strip body includes a first part which extends along a length direction of the circuit board and a second part which extends along a width direction of the circuit board body, and the temperature collection element is connected with the second part.

In some embodiments, the battery unit includes a top sheet fit with the battery top cover, the top sheet includes a temperature collection opening, and the temperature measurement unit is fit with the battery top cover exposed at the temperature collection opening.

In some embodiments, the electrical connecting sheet includes an avoiding hole, and the avoiding hole is configured to prevent contact between the electrical connecting sheet and the temperature collection element.

In some embodiments, the limiting structure is arranged in an opening of the harness plate body, and extends from the middle part of the harness plate body towards one side of the edge along a width direction of the harness plate body.

In some embodiments, the circuit board is a flexible circuit board; and/or, the temperature collection element is an NTC temperature sensor.

Embodiments of the present application provide a device, including a battery module in the above embodiment, and the battery module is configured to provide electric energy.

Based on the battery module provided in the embodiments of the present application, the temperature collection element collects temperature of the battery unit through collecting the temperature of the battery top cover. Compared with the temperature of the electrical connecting sheet, the temperature of the battery top cover is more approximate to the actual temperature inside the battery unit, the temperature difference between the two can still be within an acceptable range even if under severe working conditions, therefore, the temperature collected by the temperature collection element can more accurately reflect the actual temperature inside the battery unit, thereby being beneficial for ensuring discharge power of the battery module. In addition, since the harness plate includes a limiting structure which is matched with the temperature measurement unit to limit the position of the temperature measurement unit, the temperature measurement unit is arranged between the electrical connecting sheet and the battery top cover, the electrical connecting sheet exerts pressure onto the temperature measurement unit, such that the temperature measurement unit is kept in contact with the battery top cover, thereby being beneficial for ensuring stable and reliable temperature transmission path between the battery top cover and the temperature collection element, and further being beneficial for ensuring that the temperature collection element accurately collects the temperature of the battery top cover under various shocking or vibrating working conditions.

Other characteristics and advantages of the present application will become clear through a detailed description of the exemplary embodiments of the present application with reference to the accompanying drawings below.

DETAILED DESCRIPTION

Figure 1:
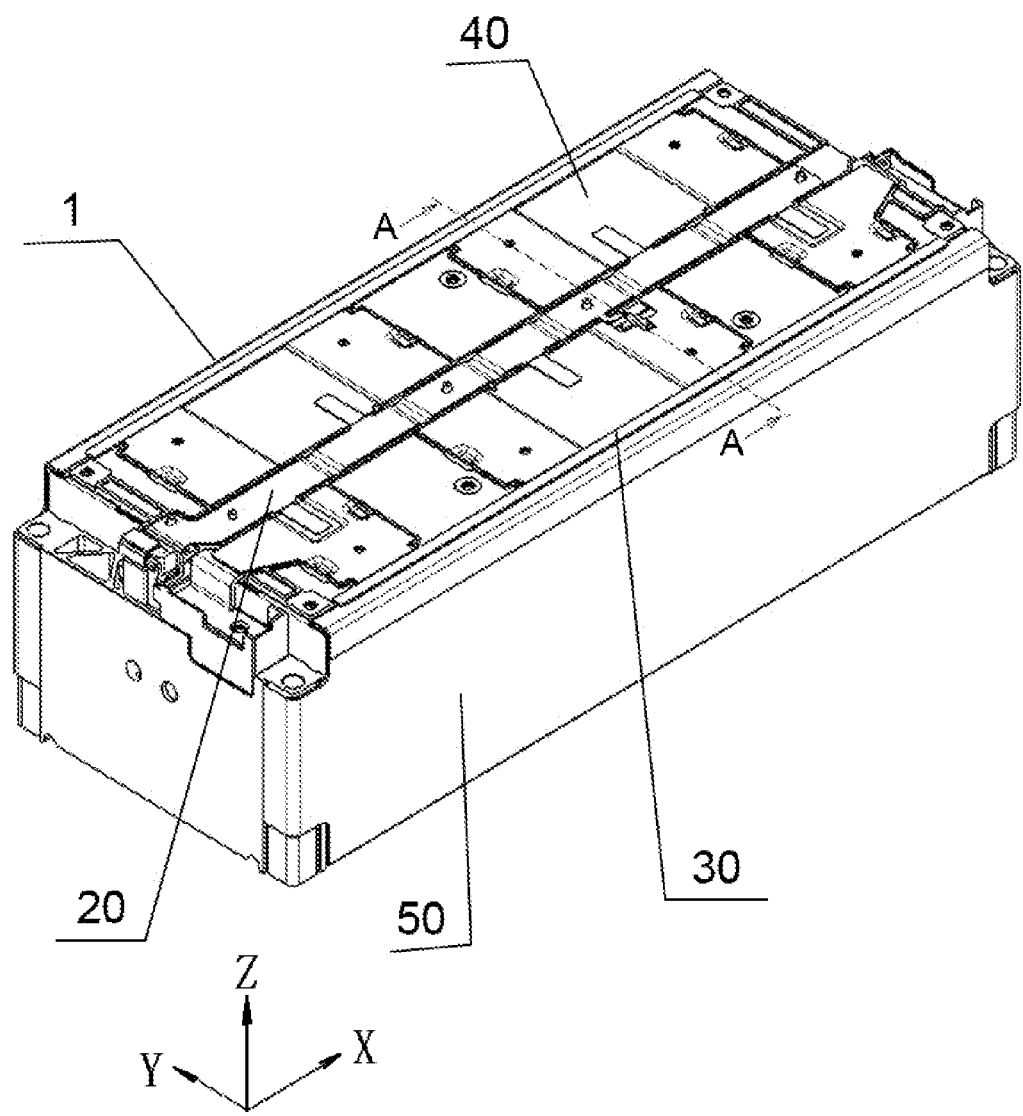
FIG. 1 is a structural schematic diagram of a battery module of an embodiment of the present application.

A clear and complete description will be given below on the technical solutions in the embodiments of the present application in combination with accompanying drawings in the embodiments of the present application. The embodiments described below are only a part but not all of the embodiments of the present application. The description of at least one exemplary embodiment below is illustrative, rather than serving as any limitation to the present application and its applications or uses. Based upon the embodiments of the present application, all the other embodiments which can occur to those skilled in the art without any inventive effort shall all fall into the protection scope of the present application.

Unless otherwise specified, the relative arrangement, numerical expressions and numerical values of the parts and steps described in these embodiments do not limit the scope of the present application. Meanwhile, it should be understood that, to facilitate description, the dimension of each part shown in the accompanying drawings is not drawn according to actual proportions. The techniques, methods and devices known to those skilled in the art may not be discussed in detail, however, under appropriate conditions, the description of techniques, methods and devices should be deemed as a part of the authorized description. In all the examples shown and discussed herein, any specific value should be explained as merely exemplary, rather than as a limitation. Therefore, other examples of the exemplary embodiments can have different values. It should be noted that, in the following drawings, similar reference numerals and letters represent similar items, therefore, once one item is defined in one accompanying drawing, then the item does not need to be further discussed in the subsequent accompanying drawings.

In the description of the present application, it should be understood that, the orientation or positional relationship indicated by such terms as "front, rear, up, down, left, right", "lateral, longitudinal, vertical, horizontal", and "top, bottom" is merely for the convenience of description of the present application and simplified description, rather than indicating or implying that the device or element referred to must be located in a certain orientation or must be constructed or operated in a certain orientation without a statement to the contrary, therefore, the terms cannot be understood as a limitation to the protection scope of the present application; and such orientation terms as "inner, outside" mean inner or outside relative to the contour of each part itself.

In the following description, the length direction of the battery module corresponds to the X direction shown in FIG. 1, the width direction of the battery module corresponds to the Y direction shown in FIG. 1, and the height direction of the battery module is the up and down direction and corresponds to the Z direction shown in FIG. 1.

As shown in FIG. 1 to FIG. 13, embodiments of the present application provide a battery module 1. The battery module 1 includes a plurality of battery units 10, a temperature measurement unit 90, a harness plate 30, a circuit board 20 and an electrical connecting sheet 40.

The battery unit 10 includes a battery top cover 15. The temperature measurement unit 90 includes a temperature collection element 91 configured to collect temperature of the battery top cover 15. The harness plate 30 is arranged on the battery top cover 15 and includes a harness plate body 31 and a limiting structure 32 arranged on the harness plate body 31. The limiting structure 32 is matched with the temperature measurement unit 90 to limit the position of the temperature measurement unit 90. The circuit board 20 is arranged on the harness plate 30 and includes a circuit board body 21 and an extending strip 23 arranged on the circuit board body 21. The temperature collection element 91 is connected with the extending strip 23 to transmit collected temperature signals to the circuit board body 21 through the extending strip 23. The electrical connecting sheet 40 is configured to connect adjacent battery units 10 and is arranged on the harness plate 30. The temperature measurement unit 90 is arranged between the electrical connecting sheet 40 and the battery top cover 15, and the electrical connecting sheet 40 exerts pressure onto the temperature measurement unit 90, such that the temperature measurement unit 90 is kept in contact with the battery top cover 15.

In the battery module 1 of the embodiment of the present application, since the temperature collection element 91 collects temperature of the battery unit 10 through collecting the temperature of the battery top cover 15, compared with the temperature of the electrical connecting sheet 40, the temperature of the battery top cover 15 is more approximate to the actual temperature inside the battery unit 10, the temperature difference between the two can still be within an acceptable range even if under severe working conditions, for example, within 5° C., therefore, the temperature collected by the temperature collection element 91 can more accurately reflect the actual temperature inside the battery unit 10, thereby being beneficial for ensuring discharge power of the battery module 1. In addition, since the harness plate 30 includes the limiting structure 32 which is matched with the temperature measurement unit 90 to limit the position of the temperature measurement unit 90, the temperature measurement unit 90 is arranged between the electrical connecting sheet 40 and the battery top cover 15, the electrical connecting sheet 40 exerts pressure onto the temperature measurement unit 90, such that the temperature measurement unit 90 is kept in contact with the battery top cover 15, thereby being beneficial for ensuring stable and reliable temperature transmission path between the battery top cover 15 and the temperature collection element 91, and further being beneficial for ensuring that the temperature collection element 91 accurately collects the temperature of the battery top cover 15 under various shocking or vibrating working conditions. As shown in FIG. 1, FIG. 2, FIG. 4, FIG. 7 to FIG. 10 and FIG. 13, in some embodiments, the limiting structure 32 is arranged between the electrical connecting sheet 40 and the battery top cover 15, and the electrical connecting sheet 40 exerts pressure onto the temperature measurement unit 90 through the limiting structure 32. In the device, the electrical connecting sheet 40 does not directly press downwards against the temperature measurement unit 90, the limiting structure 32 directly bears the pressure of the electrical connecting sheet 40, and places such important parts of the temperature measurement unit 90 as the temperature collection element 91 under the protection of the limiting structure 32, thereby being beneficial for improving reliability and prolonging service life of the temperature measurement unit 90.

As shown in FIG. 1, FIG. 2, FIG. 4, FIG. 7 to FIG. 10 and FIG. 13, in some embodiments, the temperature measurement unit 90 further includes a reinforcing plate 92, wherein the reinforcing plate 92 is connected with the extending strip 23, a connecting area, on the extending strip 23, of the temperature collection element 91 is within a connecting area, on the extending strip 23, of the reinforcing plate 92; the limiting structure 32 is in limiting match with the reinforcing plate 92, and the electrical connecting sheet 40 exerts pressure onto the reinforcing plate 92 of the temperature measurement unit 90 through a limiting structure 32. In the arrangement, the limiting structure 32 and the reinforcing plate 92 mainly bear the pressure of the electrical connecting sheet 40. On the one hand, the reinforcing plate 92 enhances the strength of the part at which the extending strip 23 is connected with the temperature collection element 91, thereby being beneficial for reliable connection between the temperature collection element 91 and the extending strip 23, and improving reliability of transmission of signals to the circuit board 20 by the temperature collection element 91. On the other hand, the reinforcing plate 92 bears the pressure of the electrical connecting sheet 40 on the temperature measurement unit 90, thereby being beneficial for protecting the temperature collection element 91 from damage of a mechanical force, and further being beneficial for improving reliability and prolonging service life of the temperature measurement unit 90.

As shown in FIG. 1, FIG. 2, FIG. 4, FIG. 7 to FIG. 10 and FIG. 13, in some embodiments, the temperature collection element 91 and the reinforcing plate 92 are arranged at two sides of the extending strip 23 respectively. At this time, the reinforcing plate 92 can be arranged between the extending strip 23 and the battery top cover 15, and can also be arranged between the extending strip 23 and the electrical connecting sheet 40.

In some embodiments, the temperature collection element 91 and the reinforcing plate 92 are arranged on the same side of the extending strip 23, the reinforcing plate 92 includes an accommodating hole, and the temperature collection element 91 is arranged in the accommodating hole. At this time, the reinforcing plate 92 and the temperature collection element 91 can be arranged between the extending strip 23 and the battery top cover 15 or arranged between the extending strip 23 and the electrical connecting sheet 40.

Position changes of the temperature collection element 91, the reinforcing plate 92 and the extending strip 23 can influence the temperature collection path or stress degree of the temperature collection element 91, and the installation positions of the temperature collection element 91 and the reinforcing plate 92 can be selected according to the temperature collection environment required by the temperature collection element.

As shown in FIG. 5 to FIG. 10 and FIG. 13, in some embodiments, the limiting structure 32 includes a limiting clamping groove 322, and the reinforcing plate 92 is installed in the limiting clamping groove 322. Connection between the limiting clamping groove 322 and the reinforcing plate 92 is beneficial for rapid assembly and disassembly of the temperature measurement unit 90 and the limiting structure 32.

As shown in FIG. 5 to FIG. 10 and FIG. 13, in some embodiments, the limiting structure 32 includes a limiting protrusion 323 which protrudes towards the electrical connecting sheet 40, and the limiting protrusion 323 is abutted against the electrical connecting sheet 40. The connection between the limiting protrusion 323 and the electrical connecting sheet 40 is beneficial for controlling distance between the electrical connecting sheet 40 and the battery top cover 15, and provides an installation space for the temperature measurement unit 90, and is further beneficial for ensuring that key parts of the temperature measurement unit 90 are not subjected to a mechanical damage.

Figure 10:
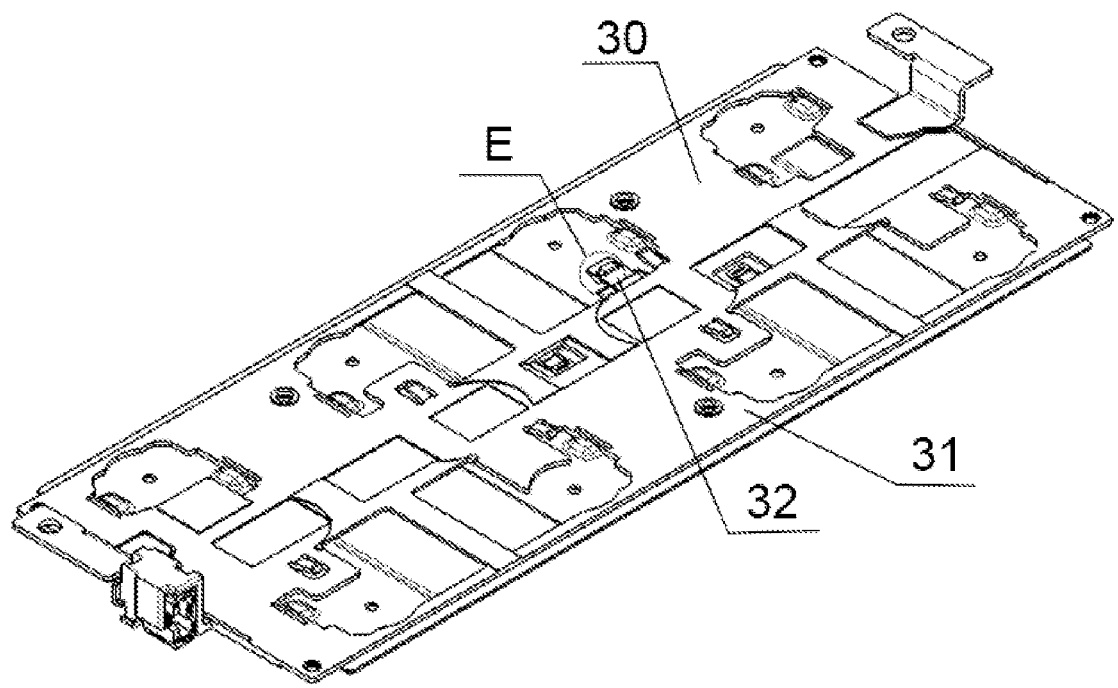
FIG. 10 is a structural schematic diagram of a bottom of the assembly structure shown in FIG. 7.
Figure 11:
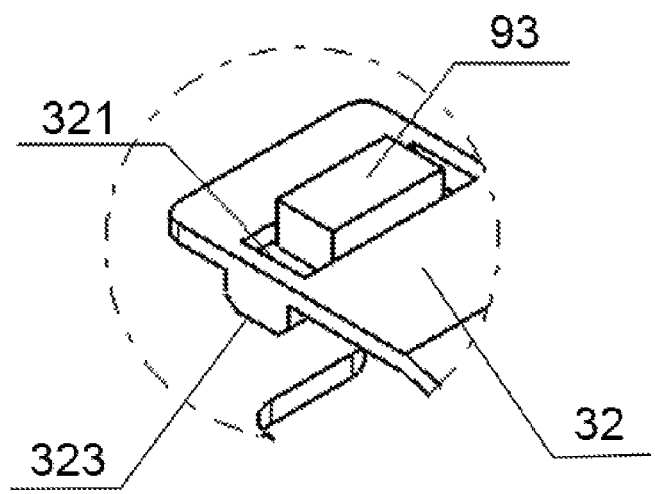
FIG. 11 is an enlarged structural schematic diagram of part E in FIG. 10.
Figure 13:
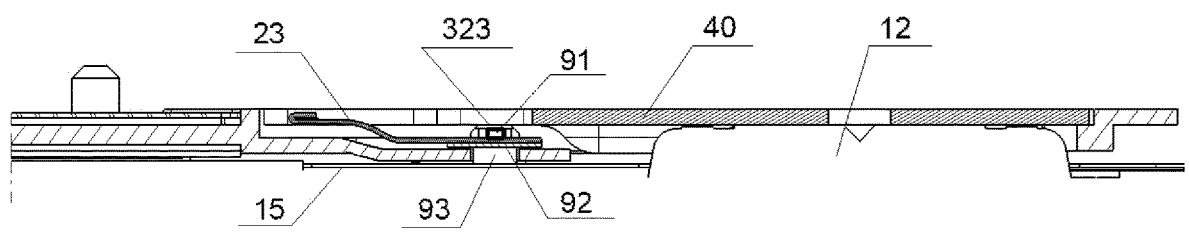
FIG. 13 is a partial structural schematic diagram along direction A-A of FIG. 1.

As shown in FIG. 10, FIG. 11 and FIG. 13, in some embodiments, the temperature measurement unit 90 includes a thermal conducting pad 93, and the thermal conducting pad 93 is arranged between the temperature collection element 91 and the battery top cover 15. Heat is transferred to the temperature collection element 91 through the thermal conducting pad 93, a buffer layer can be formed between the battery top covers 15 and the temperature collection element 91, thereby being beneficial for ensuring that heat conduction can still be maintained between the temperature collection element 91 and the battery top cover 15 through the thermal conducting pad 93 under various shocking or vibrating working conditions, and further being beneficial for maintaining continuity and stability of temperature signal collection by the temperature collection element 91.

As shown in FIG. 5, FIG. 6, FIG. 10, FIG. 11 and FIG. 13, in some embodiments, the limiting structure 32 includes a limiting hole 321, and the thermal conducting pad 93 is arranged in the limiting hole 321. Placement of the thermal conducting pad 93 in the limiting hole 321 is beneficial for limiting position of the thermal conducting pad 93, thereby effectively preventing the thermal conducting pad 93 and the temperature collection position on the battery top cover 15 or the temperature collection element 91 from cutting off heat conduction, and being beneficial for maintaining continuity and stability of temperature signal collection by the temperature collection element 91.

Figure 12:
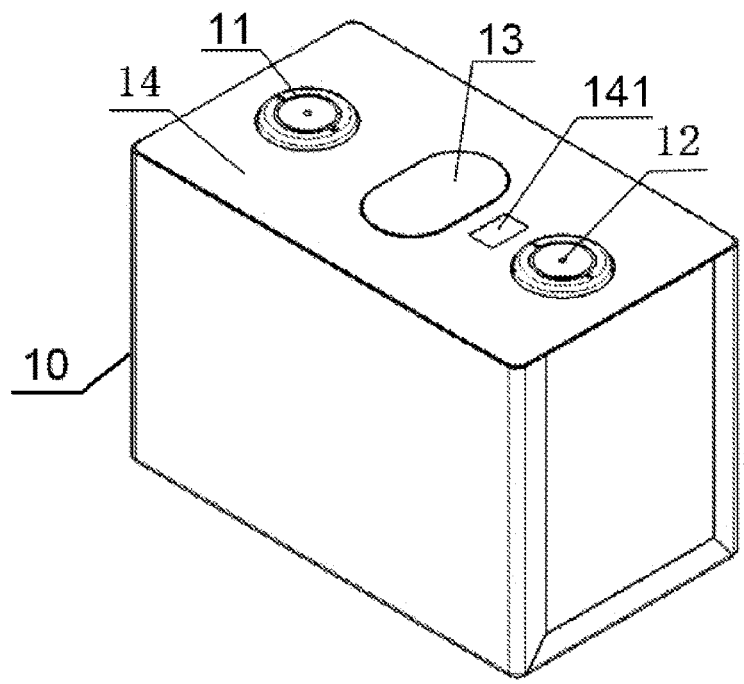
FIG. 12 is a structural schematic diagram of a battery unit in the battery module shown in FIG. 1.

As shown in FIG. 12, in some embodiments, the battery unit 10 includes a top sheet 14 arranged on the battery top cover 15, and the top sheet 14 is attached to an upper surface of the battery top cover 15. On the one hand, the top sheet 14 plays a role of insulation, and prevents short circuit between the battery top cover 15 and the external circuit. On the other hand, the top sheet 14 plays a role of protection, and prevents the battery top cover 15 from being scratched.

To collect the surface temperature of the battery top cover 15, the top sheet 14 includes a temperature collection opening 141, and the temperature measurement unit 90 is fit with the battery top cover 15 exposed from the temperature collection opening 141. The setting can avoid influence of the top sheet 14 on the temperature collection path of the temperature collection element 91, thereby being beneficial for the temperature collection element 91 to collect temperature of the battery top cover 15 more timely and accurately.

Figure 9:
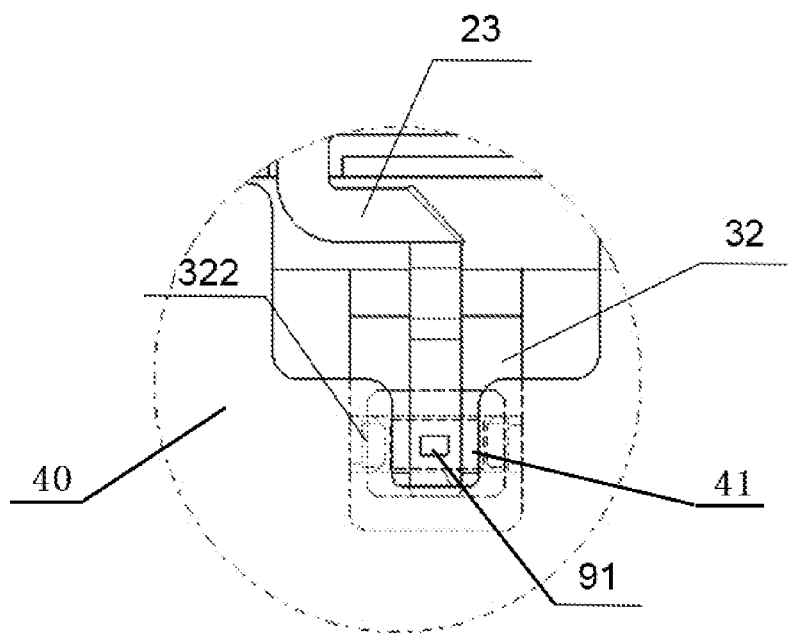
FIG. 9 is a partial structural schematic diagram of an assembly structure of a harness plate, a circuit board, an electrical connecting sheet and a temperature measurement unit in the battery module shown in FIG. 1.

As shown in FIG. 9, in some embodiments, the electrical connecting sheet 40 includes an avoiding hole 41, and the avoiding hole 41 is configured to prevent contact between the electrical connecting sheet 40 and the temperature collection element 91. The setting is beneficial for preventing heat exchange between the electrical connecting sheet 40 and the temperature collection element 91, thereby being beneficial for improving accuracy in temperature collection by the temperature collection element 91.

Embodiments of the present application will be further illustrated below in combination with FIG. 1 to FIG. 13.

As shown in FIG. 1 to FIG. 13, the battery module 1 includes a plurality of battery units 10, a circuit board 20, a harness plate 30, an electrical connecting sheet 40, a shell 50 and a temperature measurement unit 90.

As shown in FIG. 12, the battery unit 10 includes a battery housing, an electrode assembly (not shown in the figure), a battery top cover 15, a positive electrode terminal 11, a negative electrode terminal 12, an anti-explosion valve 13 and a top sheet 14.

Figure 5:
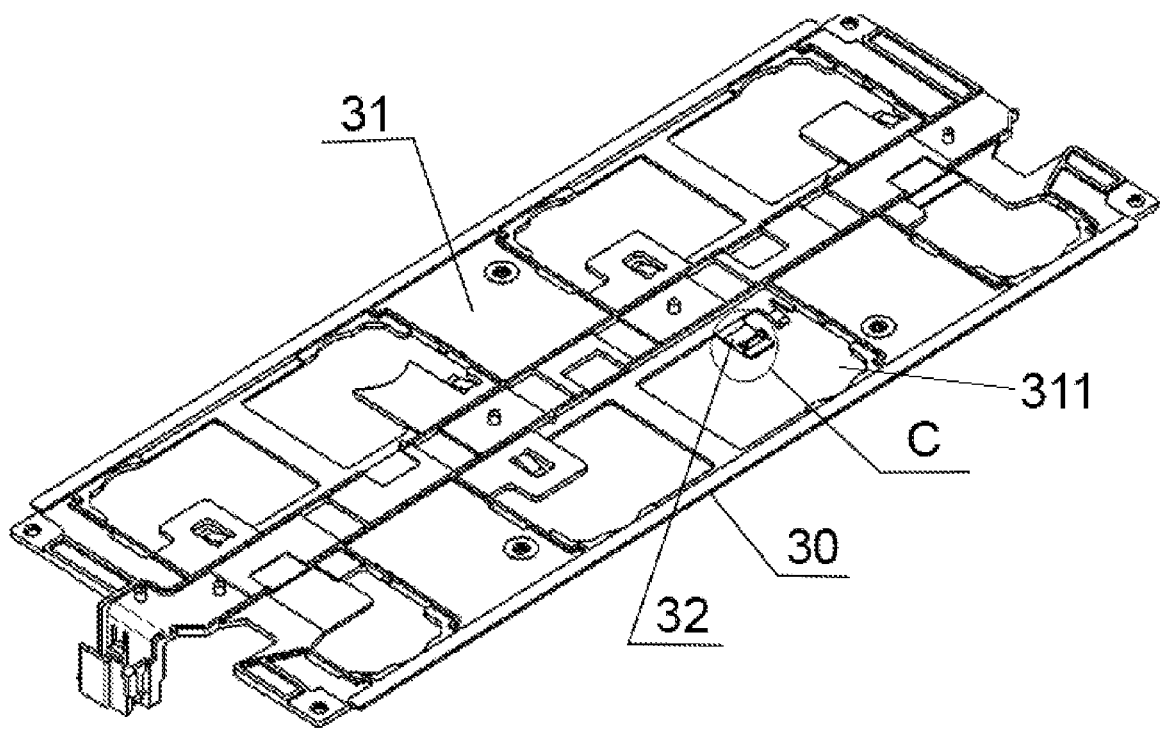
FIG. 5 is a structural schematic diagram of a harness plate in the battery module shown in FIG. 1.
Figure 6:
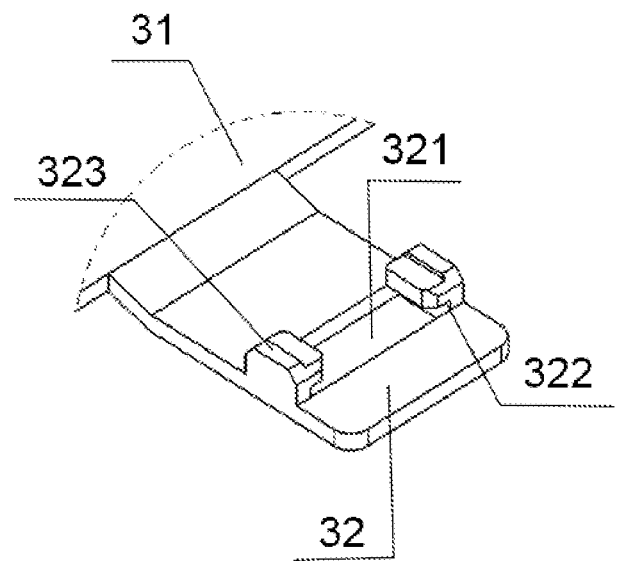
FIG. 6 is an enlarged structural schematic diagram of part C in FIG. 5.
Figure 7:
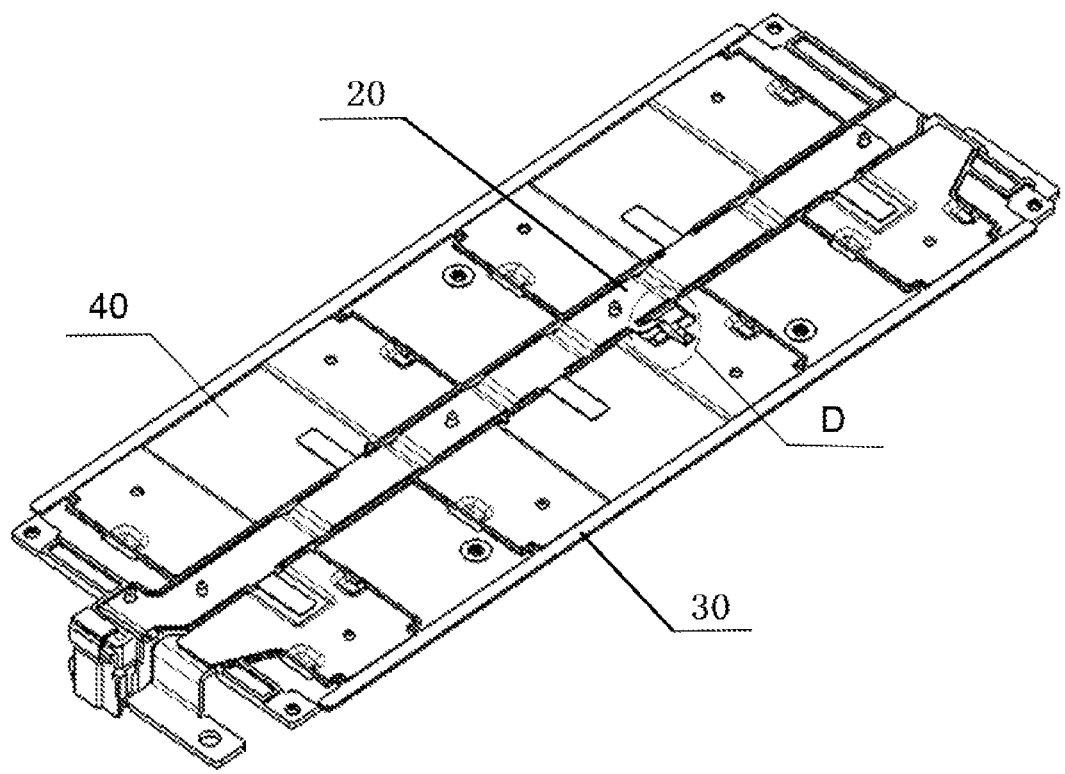
FIG. 7 is a structural schematic diagram of an assembly structure of a harness plate, a circuit board, an electrical connecting sheet and a temperature measurement unit in the battery module shown in FIG. 1.

As shown in FIG. 5 and FIG. 6, the harness plate 30 includes a harness plate body 31 and a limiting structure 32.

As shown in FIG. 1 to FIG. 4 and FIG. 13, the circuit board 20 includes a circuit board body 21, a metal sheet 22, an extending strip 23 and a connector 24.

As shown in FIG. 8, FIG. 9, FIG. 11 and FIG. 13, the temperature measurement unit 90 includes a temperature collection element 91, a reinforcing plate 92 and a thermal conducting pad 93.

A plurality of battery units 10 are arranged side by side along a length direction X of the battery module 1 in the shell 50. The harness plate 30 is arranged above the plurality of battery units 10. The circuit board 20 is arranged above the harness plate 30. The length direction X and the width direction Y of the harness plate 30 are correspondingly consistent with the length direction X and the width direction Y of the battery module 1. The electrical connecting sheet 40 is arranged above the harness plate 30. The number of the electrical connecting sheet 40 is determined according to the number of the battery units 10, and the electrical connecting sheet 40 connects the electrode terminals of adjacent battery units 10, to realize electrical connection between the battery units 10.

The circuit board 20 is a flexible printed circuit (FPC). The circuit board body 21 of the circuit board 20 is strip-shaped, and is arranged in the middle position of the width direction Y of the harness plate 30, and the length direction X and the width direction Y of the circuit board body 21 are consistent with the length direction X and the width direction Y of the battery module 1.

The number of the metal sheet 22 of the circuit board 20 is consistent with the number of the electrical connecting sheet 40, and the metal sheet 22 is configured to connect the electrical connecting sheet 40 and the circuit board 20.

The connector 24 is arranged on an end of the length direction X of the circuit board body 21, and is configured to connect the external circuit.

Figure 2:
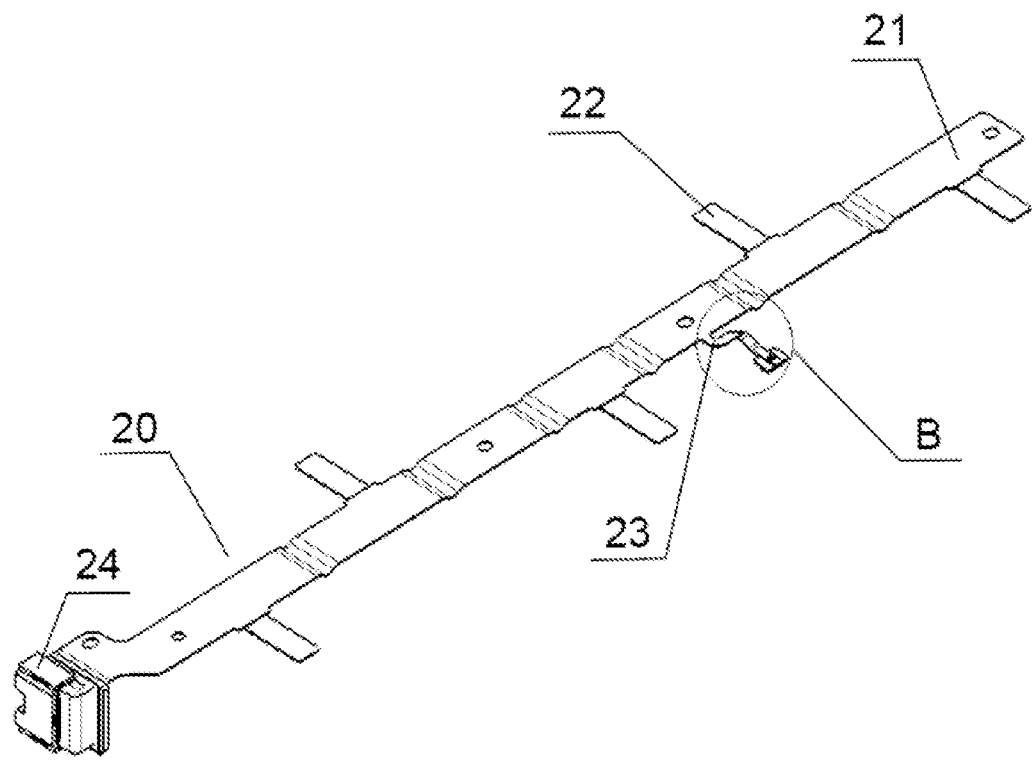
FIG. 2 is a structural schematic diagram showing connection between a circuit board in the battery module shown in FIG. 1 and a temperature collection element and a reinforcing plate of the temperature measurement unit.
Figure 3:
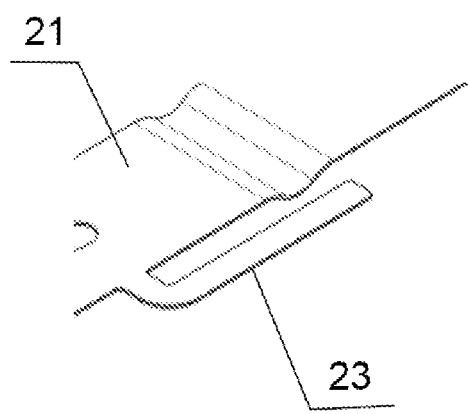
FIG. 3 is a partial structural schematic diagram of a circuit board in the battery module shown in FIG. 1 when an extending strip body is in a flattened state.
Figure 4:
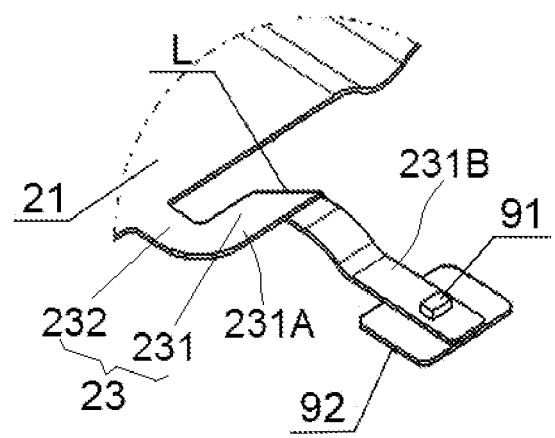
FIG. 4 is an enlarged structural schematic diagram of part B in FIG. 2.

As shown in FIG. 2 to FIG. 4, the extending strip 23 of the circuit board 20 includes an extending strip body 231 and an extending strip connecting part 232 which connects the extending strip body 231 and the circuit board body 21. The extending strip connecting part 232 in the present embodiment is a section of connecting strip which extends along the width direction Y of the circuit board 20. The extending strip 23 has the same material as the circuit board body 21.

The extending strip body 231 has a flattened state when the circuit board 20 is not assembled into the battery module 1 and a bending state when the circuit board 20 is assembled into the battery module 1. As shown in FIG. 3, in the flattened state, the length direction X of the extending strip body 231 is consistent with the length direction X of the circuit board body 21. As shown in FIG. 4, in the bending state, the extending strip body 231 is bent to an L shape, the extending strip body 231 includes a first part 231A which extends along the length direction X of the circuit board 20 and a second part 231B which extends along a width direction Y of the circuit board body 21, and the temperature collection element 91 is connected with the second part 231B.

The setting of the extending strip body along the length direction X of the circuit board 20 when the extending strip body is in a flattened state is beneficial for reducing material cost of the circuit board 20. The extending strip body is bent along a bending line L (refer to FIG. 4) to form an L shape, and the second part 231B of the extending strip body 231 extends along the width direction Y, thereby being beneficial for ensuring that the temperature collection element 91 on the tail end of 231B of the extending strip body 231 is just faced the position of the temperature collection opening 141 on the top sheet 14 above the battery top cover 15.

The temperature collection element 91 in the present embodiment is an NTC (negative temperature coefficient) temperature sensor. The temperature collection element 91 is connected with the extending strip 23, to transmit temperature signals collected by the temperature collection element 91 to the corresponding circuit in the circuit board body 21.

Figure 8:
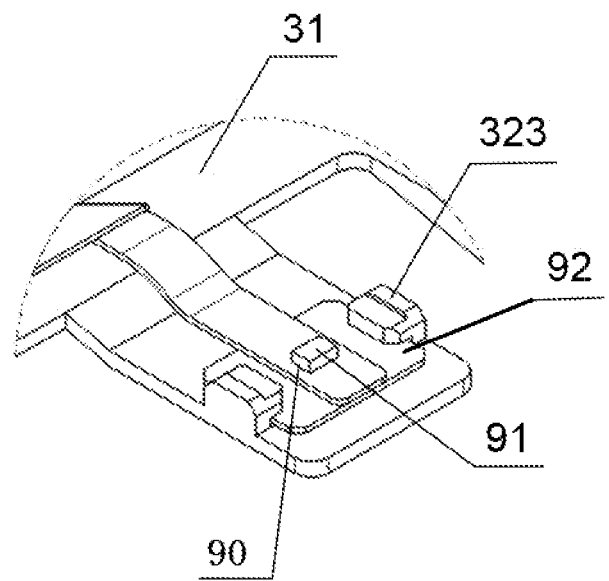
FIG. 8 is an enlarged structural schematic diagram of part D in FIG. 7, wherein the electrical connecting sheet is not shown.

As shown in FIG. 8, the temperature collection element 91 and the reinforcing plate 92 are respectively arranged at two sides of the extending strip 23. The connecting area, on the extending strip 23, of the temperature collection element 91 is within the connecting area, on the extending strip 23, of the reinforcing plate 92.

The reinforcing plate 92 can enhance the strength of the position at which the temperature collection element 91 is installed on the extending strip 23, and the reinforcing plate 92 is further configured to bear a counter-acting force produced by prepressing the thermal conducting pad 93.

The thermal conducting pad 93 should have a high thermal conductivity coefficient and amount of compression, and can bear expansion and deformation of the battery module 1 until the end of life (EOL) and the extrusion during shock or vibration.

As shown in FIG. 12, the top sheet 14 fit on the battery top cover 15 is provided with a temperature collection opening 141, and the part of the battery top cover 15 exposed at the temperature collection opening 141 is in direct contact with the thermal conducting pad 93 of the temperature measurement unit 90.

As shown in FIG. 12, the temperature collection opening 141 on the top sheet 14 is arranged between the positive electrode terminal 11 and the negative electrode terminal 12 of the battery unit 10, and is adjacent to the negative electrode terminal 12, thereby being beneficial for more accurate collection of temperature of the battery unit 10 by the temperature collection element 91.

The limiting structure 32 of the harness plate 30 limits position of the temperature measurement unit 90, and simultaneously limits the position of the tail end of the extending strip 23 of the circuit board 20.

The limiting structure 32 of the harness plate 30 is arranged in an opening 311 of the harness plate body 31, and extends from the middle part of the harness plate body 31 to the side of the edge of the harness plate body 31 along the width direction Y of the harness plate body 31. The set position of the limiting structure 32 is beneficial for realizing match between the limiting structure 32 and the extending strip 23 as well as the electrical connecting sheet 40.

The limiting structure 32 as a whole is of a plate-shaped structure, and includes a limiting hole 321, a limiting clamping groove 322 and a limiting protrusion 323. The limiting hole 321 is arranged in the middle of the plate-shaped structure, and is a square hole. The limiting clamping groove 322 is formed by two L-shaped clamping blocks which are arranged correspondingly at two opposite edges of the limiting hole 321. Each of the top ends of the two L-shaped clamping blocks is provided with a limiting rib which protrudes upwards as a limiting protrusion 323.

As shown in FIG. 6, the plate-shaped structure includes a first plate which sinks relative to the harness plate body 31 and a second plate which connects the harness plate body 31 and the first plate and which is gradually downwards from the harness plate body 31 to the first plate. The limiting hole 321, the limiting clamping groove 322 and the limiting protrusion 323 are all arranged on the first plate. The setting is beneficial for better limiting the position of each component of the temperature measurement unit 90.

The limiting clamping groove 322 of the limiting structure 32 locates the position of the reinforcing plate 92 of the temperature measurement unit 90, to prevent up and down movement of the reinforcing plate 92 due to force. The thermal conducting pad 93 is arranged in the limiting hole 321, and the side wall of the limiting hole 321 limits the positions of the thermal conducting pad 93 in the length direction X and the width direction Y. The limiting rib serving as the limiting protrusion 323 is fit with the lower surface of the electrical connecting sheet 40, and the electrical connecting sheet 40 presses tightly against the limiting structure 32 and the reinforcing plate 92 connected with the limiting structure 32, to prevent the limiting structure 32 and the reinforcing plate 92 from upwarping, and further to prevent separation of the thermal conducting pad 93 arranged below the reinforcing plate 92 from the battery top cover 15.

When the assembly structure above the battery unit 10 of the battery module 1 is assembled, after the electrical connecting sheet 40 is assembled on the harness plate 30, the circuit board 20 and the temperature measurement unit 90 are then assembled, the reinforcing plate 92 is installed in the limiting clamping groove 322, and then the avoiding hole 41 of the electrical connecting sheet 40 corresponds to the position of the temperature collection element 91.

The electrical connecting sheet 40 is provided with an avoiding hole 41 to avoid from the temperature collection element 91, so as to avoid transmission of the temperature of the electrical connecting sheet 40 to the temperature collection element 91. The electrical connecting sheet 40 pressing the limiting protrusion 323 of the limiting structure 32 should not be influenced by the forming of the avoiding hole 41, to ensure that the electrical connecting sheet 40 presses downwards against the reinforcing plate 92 through pressing against the limiting protrusion 323, so as to press downwards against the temperature measurement unit 90.

After the above assembly steps are finished, the well-assembled assembly structure is turned over, a thermal conducting pad 93 is pasted on the back side of the reinforcing plate 92, and the thermal conducting pad 93 is placed in the limiting hole 321 of the limiting structure 32, to make it easy for a hole wall of the limiting hole 321 to limit displacement of the thermal conducting pad 93. Of course, the thermal conducting pad 93 can also be directly pasted at the temperature collection position of the battery top cover 15, and after the above well-assembled assembly and the battery unit 10 are assembled, contact between the thermal conducting pad 93 and the reinforcing plate 92 or the temperature collection element 91 can also be realized. The thermal conducting pad 93 may also be self-adhesive, and may be manufactured from silicone rubber. Such type of thermal conducting pad can be bonded with the battery top cover 15 and the reinforcing plate 92 through no adhesive layer, thereby shortening the temperature collection path of the temperature collection element 91.

In the present embodiment, the thickness of the thermal conducting pad 93 should be greater than the gap between the reinforcing plate 92 and the top cover, to ensure that the temperature collection path of the temperature collection element 91 is kept smooth. The initial thickness of the thermal conducting pad 93 can be set in consideration with shoulder height tolerance of the battery and deformations under various working conditions. After the above well-assembled assembly structure and the battery unit are assembled, each electrical connecting sheet 40 and the corresponding electrode terminals of the battery units 10 are welded.

After the electrical connecting sheet 40 is welded with the corresponding electrode terminals, the position of the electrical connecting sheet 40 in the height direction is defined, through pressing tightly against the limiting protrusion 323 of the limiting structure 32 through the lower surface of the electrical connecting sheet 40, the thermal conducting pad 93 below the reinforcing plate 92 and the battery top cover 15 form interference contact, to ensure that the temperature collection path between the battery top cover 15 and the temperature collection element 91 is kept smooth, and improve reliability of temperature collection.

In the battery module 1 of the embodiment of the present application, the temperature collection element 91 realizes temperature collection of the battery unit 10 through collecting temperature of the battery top cover 15. Compared with the temperature of the electrical connecting sheet 40, the temperature of the battery top cover 15 is more approximate to the actual temperature inside the battery unit 10, thereby being beneficial for ensuring the discharge power of the battery module 1. The heat transfer path in the temperature collection process is effectively shortened compared with the prior art, thereby being beneficial for improving accuracy and response speed of temperature collection. The temperature measurement unit 90 ensures stable and reliable temperature transmission path between the battery top cover 15 and the temperature collection element 91 through the thermal conducting pad 93 and the reinforcing plate 92, and can ensure that the temperature collection element 91 accurately collects the temperature of the battery top cover 15 under various shocking or vibrating working conditions.

Embodiments of the present application further provide a device, including the battery module described above, and the battery module is configured to provide electric energy. Wherein the device can be a vehicle or an energy-storage device.

Finally, it should be noted that, the above embodiments are merely for illustrating the technical solutions of the present application, rather than for limiting the present application. Although the present application is described in detail with reference to the preferred embodiments, those skilled in the art should understand that, specific embodiments of the present application can still be modified or part of the technical features can be equivalently substituted, and all the modifications or substitutions shall all fall within the scope of the technical solutions claimed in the present application.

What is claimed is:

1. A battery module, comprising:
   a plurality of battery units, comprising a battery top cover;
   a temperature measurement unit, comprising a temperature collection element configured to collect temperature of the battery top cover;
   a harness plate, arranged on the battery top cover and comprising a harness plate body and a limiting structure arranged on the harness plate body, wherein the limiting structure is configured to cooperate with the temperature measurement unit to limit the position of the temperature measurement unit;
   a circuit board, arranged on the harness plate and comprising a circuit board body and an extending strip arranged on the circuit board body, wherein the temperature collection element is connected with the extending strip to transmit collected temperature signals to the circuit board body through the extending strip; and
   an electrical connecting sheet, connecting adjacent battery units and arranged on the harness plate, wherein the temperature measurement unit is arranged between the electrical connecting sheet and the battery top cover, and the electrical connecting sheet is configured to exert pressure onto the temperature measurement unit, such that the temperature measurement unit is kept in contact with the battery top cover.

2. The battery module according to claim 1, wherein the limiting structure is arranged between the electrical connecting sheet and the battery top cover, and
   wherein the electrical connecting sheet is configured to exert pressure onto the temperature measurement unit through the limiting structure.

3. The battery module according to claim 1, wherein the temperature measurement unit comprises a reinforcing plate,
   wherein the reinforcing plate is connected with the extending strip,
   wherein a connecting area, on the extending strip, of the temperature collection element is within a connecting area, on the extending strip, of the reinforcing plate,
   wherein the limiting structure is fitted with the reinforcing plate in a limiting manner, and
   wherein the electrical connecting sheet is configured to exert pressure onto the reinforcing plate of the temperature measurement unit through the limiting structure.

4. The battery module according to claim 3, wherein the temperature collection element and the reinforcing plate are arranged at two sides of the extending strip respectively.

5. The battery module according to claim 3, wherein the temperature collection element and the reinforcing plate are arranged at the same side of the extending strip, and wherein the reinforcing plate comprises an accommodating hole in which the temperature collection element is located.

6. The battery module according to claim 3, wherein the limiting structure comprises a limiting clamping groove, and
wherein the reinforcing plate is arranged in the limiting clamping groove.

7. The battery module according to claim 1, wherein the limiting structure comprises a limiting protrusion which is configured to protrude towards the electrical connecting sheet, and
wherein the limiting protrusion is configured to abut against the electrical connecting sheet.

8. The battery module according to claim 1, wherein the temperature measurement unit comprises a thermal conducting pad, and
wherein the thermal conducting pad is arranged between the temperature collection element and the battery top cover.

9. The battery module according to claim 8, wherein the limiting structure comprises a limiting hole in which the thermal conducting pad is located.

10. The battery module according to claim 3, wherein the temperature measurement unit comprises a thermal conducting pad,
wherein the thermal conducting pad is arranged between the reinforcing plate and the battery top cover,
wherein the thermal conducting pad is an elastic pad, and
wherein the thickness of the thermal conducting pad in the original state is greater than the distance between the reinforcing plate and the battery top cover.

11. The battery module according to claim 1, wherein the extending strip comprises an extending strip body and an extending strip connecting part which is configured to connect the extending strip body with the circuit board body, wherein the extending strip body is bent to be L-shaped,
wherein the extending strip body comprises a first part which is configured to extend along a length direction of the circuit board and a second part which is configured to extend along a width direction of the circuit board body, and
wherein the temperature collection element is connected with the second part.

12. The battery module according to claim 1, wherein the battery unit comprises a top sheet fit with the battery top cover,
wherein the top sheet comprises a temperature collection opening, and
wherein the temperature measurement unit is fit with the battery top cover exposed at the temperature collection opening.

13. The battery module according to claim 1, wherein the electrical connecting sheet comprises an avoiding hole, and
wherein the avoiding hole is configured to prevent contact between the electrical connecting sheet and the temperature collection element.

14. The battery module according to claim 1, wherein the limiting structure is arranged in an opening of the harness plate body, and is configured to extend from the middle part of the harness plate body towards one side of the edge along a width direction of the harness plate body.

15. The battery module according to claim 1, wherein the circuit board is a flexible circuit board, and/or
wherein the temperature collection element is an NTC temperature sensor.

16. A device, comprising the battery module according to claim 1, wherein the battery module is configured to provide electric energy.

* * * * *